United States Patent [19]

Lyle, Jr. et al.

[11] Patent Number: 4,517,836
[45] Date of Patent: May 21, 1985

[54] METHOD FOR DETERMINING OIL SATURATION IN A SUBSURFACE FORMATION

[75] Inventors: W. D. Lyle, Jr., Grapevine; Luke S. Gournay, Rockwall, both of Tex.

[73] Assignee: Mobil Oil Corporation, New York, N.Y.

[21] Appl. No.: 545,333

[22] Filed: Oct. 25, 1983

[51] Int. Cl.³ .............................. E21B 49/00
[52] U.S. Cl. ........................................ 73/152
[58] Field of Search ............. 73/152, 382 R; 324/351; 364/422

[56] References Cited

U.S. PATENT DOCUMENTS 3,946,604  3/1976  Anderson ........................ 73/152
4,397,181  8/1983  Caldwell ..................... 73/382 R X

*Primary Examiner*—Jerry W. Myracle
*Attorney, Agent, or Firm*—A. J. McKillop; Michael G. Gilman; George W. Hager, Jr.

[57] ABSTRACT

A borehole logging system includes a borehole gravity meter and a resistivity logging tool. A borehole gravity log and a resistivity log are produced over a select depth interval in a borehole. The bulk density of the subsurface formation surrounding the borehole over the select depth interval is measured from the gravity log. The bulk resistivity of the formation surrounding the borehole over the select depth interval is measured from the resistivity log. The bulk density and bulk resistivity measurements are combined to derive a measurement of the residual oil saturation of the subsurface formation surrounding the borehole for the select depth interval.

4 Claims, 2 Drawing Figures

METHOD FOR DETERMINING OIL SATURATION IN A SUBSURFACE FORMATION

BACKGROUND OF THE INVENTION

This invention relates to a new and improved method for determining oil saturation in a subsurface formation surrounding a borehole by carrying out borehole gravity measurements and deep electric log measurements.

Oil fields having had a first production run using conventional production techniques and having later had a secndary production using more sophisticated production techniques are now being considered for third generation or tertiary recovery methods. These methods are naturally more expensive than the primary and secondary recovery methods. It is therefore desirable to determine the amount of residual oil left in a given field as precisely as possible so that an accurate determination of whether or not it would be economically feasible to perform tertiary recovery techniques can be made. Furthermore, the amount of residual oil is also relevant to the selection of a particular tertiary oil recovery method.

SUMMARY OF THE INVENTION

The present invention is directed to a method for determining residual oil saturation in subsurface formations surrounding a borehole.

A borehole gravity meter is moved through a borehole for producing a borehole gravity log over a select depth interval in the borehole. An electric logging tool is also moved through the borehole for producing a resistivity log over the select depth interval in the borehole. Bulk density and bulk resistivity measurements are made from the gravity log and resistivity logs respectively for the subsurface formation surrounding the borehole over the select depth interval. These bulk gravity and bulk resistivity measurements are combined to derive a measure of the residual oil saturation of such subsurface formation.

In a further aspect, the bulk resistivity is measured by determining a weighted average of the individual resistivity measurements taken from the resistivity log from a series of equally spaced points over the select depth interval.

DESCRIPTION OF THE PREFERRED EMBODIMENT

In accordance with the present invention there is provided a new and improved method for utilizing borehole gravity measurements in the determination of oil saturation. It has been found that borehole gravity measurements taken in combination with any of the standard wireline porosity logs is not a satisfactory method for oil saturation determination due to the sensitivity of the saturation estimate to porosity errors. It is a specific feature of the present invention to minimizing such a sensitivity to porosity errors on the saturation measurement by combining borehole gravity measurements with deep electric log measurements. This combination has the advantage of minimizing the sensitivity that both the borehole gravity measurement and the deep electric log has to porosity errors when taken alone. Additionally, this method permits the oil saturation characteristic of a subsurface formation to be measured at points remote from the borehole as the borehole gravity meter is capable of yielding results proportional to the density of a formation up to about 100 feet from the borehole.

Oil saturation estimates made in accordance with the technique of the present invention are important in evaluating produced fields as candidates for enhanced oil recovery projects. Another application of this technique is in the detection of bypassed oil and gas zones in old wells which were not produced or disturbed during production operations from other oil zones surrounding the well.

Figure 1:
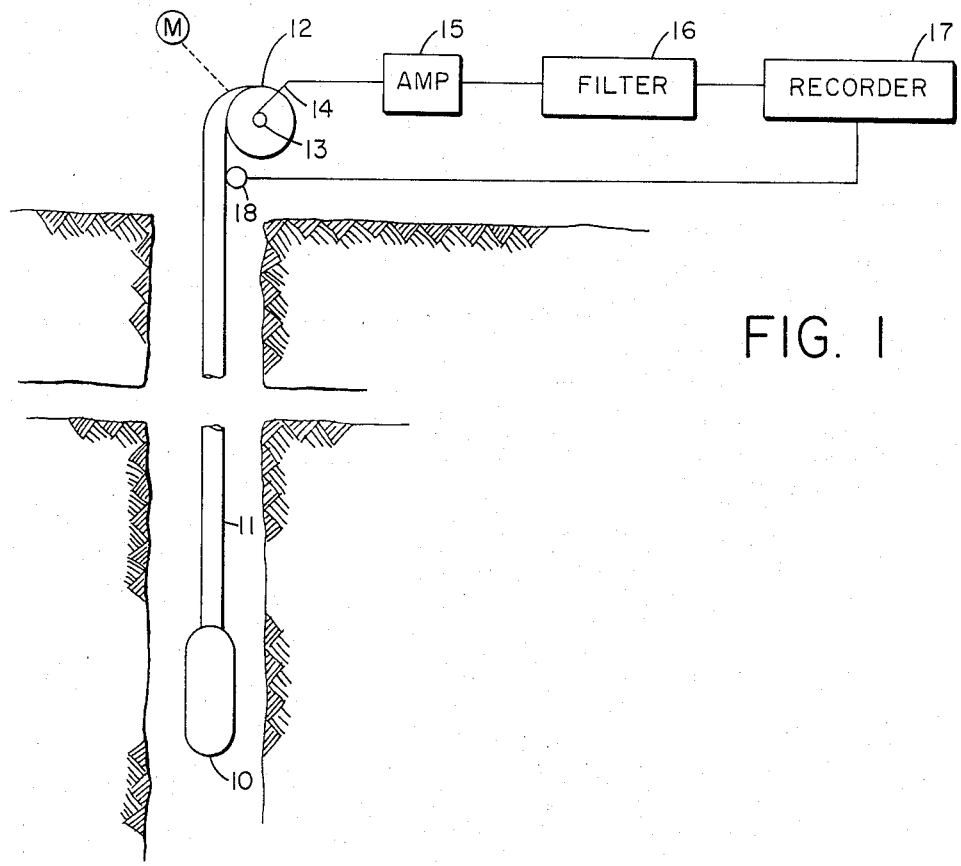
FIG. 1 illustrates a borehole gravimetry system of the prior art.

Referring now to FIG. 1, a LaCoste and Romberg type gravity meter 10 is passed down through a well extending from the surface of the earth through formations of various types until the area of interest is reached. The gravity meter 10 is lowered by means of a cable 11 running over a sheave 12, to the depth of interest. Gravimetric measurements, yielding signals proportional to the density of the surrounding formation, are then made and conducted by way of slip rings 13 and brushes 14 to an amplifier 15, a filter 16, and a recorder 17 to produce a log of gravity measurements as a function of depth. This is a log of true gravity over the depth interval of interest, such depth interval being measured by the reel 18 rotatably coupled to the cable 11.

Figure 2:
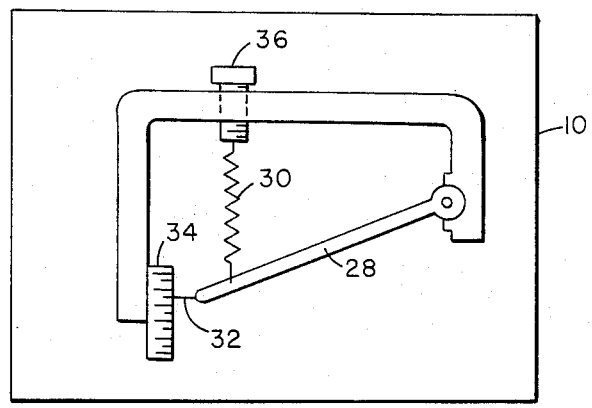
FIG. 2 illustrates a borehole gravity meter suitable for use in carrying out borehole gravity surveys.

FIG. 2 shows a schematic depiction of the LaCoste and Romberg gravity meter; other types of gravity meters are within the scope of the present invention. A lever 28 is pivoted more or less against the bias of a spring 30 in accordance with the vertical component of the earth's gravity in its immediate locale. This meter is capable of yielding results proportional to the density of the formation within a radius of about 100 feet of the borehole itself. A pointer 32 is affixed to the end of the pivoted lever 28 and indicates a point on a scale 34. The spring 30 is connected to a pre-load screw 36 which is moved in order to cause the lever pointer 32 to reach a predetermined index point on the scale 34. The amount of adjustment of the preload required to index the pointer 32 is proportional to vertical changes in gravity; thus the preload adjustment is effectively the data output by the gravity meter 10. The meter is sealed within an enclosed container before being passed down the hole.

The borehole gravity meter, as the name implies, simply measures the vertical component of the earth's gravitational acceleration at a desired depth in the borehole. Given measurements at two different depths, one obtains the gravitational gradient and can proceed to compute the formation bulk density $\rho_b$ from the following equation:

$$\rho_b = \frac{F - (\Delta g/\Delta Z)}{4\pi G}, \quad (1)$$

where F is the free air gradient;

$\Delta g$ is the gravity difference between two readings taken at two different stations;

$\Delta Z$ is the vertical distance between gravity measurement stations; and

G is the universal gravitational constant. Written in units of microgals (one gal = 1 cm/sec$^2$) for $\Delta g$, gm/cc for $\rho_b$, and feet for $\Delta Z$, we have $$\rho_b = 3.6807 - 0.0391308 \Delta g / \Delta Z. \quad (2)$$

The bulk density $\rho_b$ is representative of the horizontal slab of material that lies within $\Delta Z$; it is the accurate determination of $\rho_b$ by gravimetric techniques which makes a reliable residual oil determination feasible.

As noted above, the gravity meter of FIG. 1 is of conventional design, its details forming no part of the present invention. Similarly, the operations shown schematically in FIG. 1 are presently commercially available from logging contractors and similarly form no part of the present invention.

The formation bulk density $\rho_b$ as derived from the borehole gravity measurement expression of eq. (1) is related to other subsurface formation parameters as follows:

$$\rho_b = (1-\phi)\rho_{ma} + \phi[S_w(\rho_w - \rho_H) + \rho_H], \quad (3)$$

where
$\phi$ = porosity of the zone
$\rho_{ma}$ = matrix density of the zone
$S_w$ = water saturation
$\rho_w$ = water density
$\rho_H$ = hydrocarbon density Archie's equation relating formation resistivity, porosity, and water saturation is as follows:

$$S_w = \left[ \left( \frac{aR_w}{R_t} \right) (\phi)^{-m} \right]^{\frac{1}{n}}, \quad (4)$$

where
$aR_w \phi^{-m}$ = formation factor
$R_t$ = resistivity as obtained from an electric log
m = cementation factor
n = saturation exponent
$R_w$ = formation water resistivity.

Actual formation resistivity $R_t$ may be obtained from any of several conventional resistivity loggig tools. One preferred method for obtaining resistivity utilizes the same configuration shown in FIG. 1 with the downhole unit 10 being a resistivity logging tool instead of a gravity meter. Electrical measurements yielding signals proportional to the resistivity of the surrounding formations are sent from the resistivity logging tool to the uphole amplifier 15, filter 16 and recorder 17 for the production of an electric log of resistivity measurements as a function of depth as measured by reel 18.

A bulk resistivity component Re is derived from a series of equally spaced resistivity measurements $R_t$ along the same vertical interval $\Delta Z$ used to obtain gravity measurements with the borehole gravity meter. This derived resistivity $R_e$ is a weighted average of the individual resistivity measurements $R_t$ over the interval and represents a bulk resistivity corresponding to the same vertical interval as that over which the formation bulk density was derived. $R_e$ is derived by assuming that a cylindrical volume surrounds the wellbore with the wellbore vertically penetrating the center of the cylinder. It is further assumed that this cylinder is partitioned into a stack of N equal sub-cylinders. Standard wireline porosity and resistivity logging tools will yield a sequence of porosity values $\phi_i$ and resistivity values $R_i$ where the i subscript represents the i-th sub-cylinder in the stack. Each of these sub-cylinders has a water saturation $S_{wi}$ obtained from Archie's Law as follows:

$$S_{wi} = \left[ \left( \frac{aR_w}{R_i} \right) (\phi_i)^{-m} \right]^{\frac{1}{n}}. \quad (5)$$

The saturation $S_w$ and porosity $\phi$ of the entire cylinder are related to the sub-cylinder values by the well known relations:

$$S_w = \frac{\Sigma S_w \phi_i}{\Sigma \phi_i}, \quad (6)$$

and $$\phi = \frac{1}{N} \Sigma \phi_i, \quad (7)$$

where each sum is from one to N. Archie's Law written for the cylinder is:

$$S_w = \left[ \left( \frac{aR_w}{R_e} \right) (\phi^{-m}) \right]^{\frac{1}{n}}. \quad (8)$$

Substitution of eq. (5) into eq. (6) results in:

$$S_w = \frac{(aR_w)^{\frac{1}{n}} \Sigma \left( \frac{\phi_i^{n-m}}{R_i} \right)^{\frac{1}{n}}}{N\phi}. \quad (9)$$

Setting the $S_w$ of eq. (9) equal to the $S_w$ of eq. (8) and solving for $R_e$ results in a weighted average of the individual resistivity measurements over the depth interval:

$$R_e = \frac{N^n \phi^{n-m}}{\left[ \Sigma \left( \frac{\phi_i^{n-m}}{R_i} \right)^{\frac{1}{n}} \right]^n}, \quad (10)$$

which is the required expression for bulk resistivity. For application of the technique to by-passed hydrocarbons in older wells for which a porosity log is unavailable, the following approximation is used:

$$R_e = \frac{N^n}{\left[ \Sigma \left( \frac{1}{R_i} \right)^{\frac{1}{n}} \right]^n}. \quad (11)$$

Using this Re for any interval over which a single value of a, m, and n apply, the effect of porosity errors can be largely eliminated by formally solving for $\phi$ in eq. (4) as follows:

$$\phi = \left( \frac{aR_w}{R_e} \right)^{\frac{1}{m}} (S_w)^{\frac{-n}{m}}. \quad (12)$$

Eq. (12) is now substituted into eq. (3) to yield:

$$\rho_b = \rho_{ma} - \left[\left(\frac{aR_w}{R_e}\right)^{\frac{1}{m}} (S_w)^{\frac{-n}{m}}\right] [\rho_{ma} - S_w(\rho_w - \rho_H) - \rho_H], \quad (13)$$

in which porosity does not appear. Obviously, the porosity effects saturation, but the point of eq. (13) is that the porosity effects have been absorbed into $\rho_b$ and $R_e$, and porosity errors in porosity measurements as obtained from a wireline log do not play a dominant role.

It should be noted that a, m, and n must be constant over an interval of at least eight to ten feet vertically in the formation. This requirement is not restrictive since in many cases a, m, and n are constant over much larger distances. The eight to ten foot vertical separation requirement is a limitation of the BHGM in obtaining accurate bulk density estimates.

The desired oil saturation estimate $S_o$ can be determined in accordance with the following expression after solving eq. (13) for water saturation $S_w$:

$$S_o = 1 - S_w. \quad (14)$$

We claim:

1. A method for determining residual oil saturation in a subsurface formation surrounding a borehole, comprising the steps of:
   a. producing a borehole gravity log over a depth interval in said borehole;
   b. measuring the bulk density of the subsurface formation surrounding said borehole from said gravity log;
   c. producing a resistivity log over said depth interval in said borehole;
   d. measuring the bulk resistivity of the subsurface formation surrounding said borehole from said resistivity log by deriving a weighted average of the individual resistivity measurements taken from said resistivity log from a series of equally spaced points over said depth interval, and
   e. combining said formation bulk density and formation bulk resistivity measurements to derive a measurement of residual oil saturation whereby the effects of porosity in both said bulk density and bulk resistivity measurements on the residual oil saturation measurement are minimized.

2. The method of claim 1 wherein said residual oil saturation is derived from the formation bulk resistivity and formation bulk resistivity measurements in accordance with the following expression:

$$\rho_b = \rho_{ma} -$$

-continued $$\left[\left(\frac{aR_w}{R_e}\right)^{\frac{1}{m}} (S_w)^{\frac{-n}{m}}\right] [\rho_{ma} - S_w(\rho_w - \rho_H) - \rho_H],$$

where
$S_w$ = water saturation
$\rho_b$ = measured formation bulk density
$\rho_{ma}$ = matrix density
$R_w$ = formation water resistivity
$R_e$ = measured formation bulk resistivity
$\rho_w$ = water density
$\rho_H$ = hydrocarbon density
m = cementation factor
n = saturation exponent, and $$S_o = 1 - S_w,$$

where $S_o$ = residual oil saturation.

3. The method of claim 1 wherein said weighted average of individual resistivity measurements is derived in accordance with the following expression:

$$R_e = \frac{N^m \phi^{n-m}}{\left[\Sigma\left(\frac{\phi_i^{n-m}}{R_i}\right)^{\frac{1}{n}}\right]^n},$$

where
$R_e$ = formation bulk resistivity,
$\phi_i$ = porosity at the $i^{th}$ spaced point over the depth interval
$R_i$ = resistivity at the $i^{th}$ spaced point over the depth interval
N = number of spaced points
n = saturation exponent, and
m = cementation factor.

4. The method of claim 1 wherein the weighted average of individual resistivity measurements is derived for bypassed hydrocarbon zone in produced formations for which a porosity log is unavailable in accordance with the following expression:

$$R_e = \frac{N^m}{\left[\Sigma\left(\frac{1}{R_i}\right)^{\frac{1}{n}}\right]^n},$$

where
$R_e$ = formation bulk resistivity,
N = number of spaced points
n = saturation exponent, and
$R_i$ = resistivity at the $i^{th}$ spaced point over the depth interval.

* * * * *